United States Patent
Zagrodnik

(10) Patent No.: US 9,500,182 B2
(45) Date of Patent: Nov. 22, 2016

(54) THREE-PHASE AC ELECTRICAL SYSTEM, AND A METHOD FOR COMPENSATING AN INDUCTANCE IMBALANCE IN SUCH A SYSTEM

(71) Applicant: VESTAS WIND SYSTEMS A/S, Aarhus N (DK)

(72) Inventor: Michael Adam Zagrodnik, Singapore (SG)

(73) Assignee: VESTAS WIND SYSTEMS A/S, Aarhus N. (DK)

( * ) Notice: Subject to any disclaimer, the term of this patent is extended or adjusted under 35 U.S.C. 154(b) by 0 days.

(21) Appl. No.: 14/648,332

(22) PCT Filed: Nov. 25, 2013

(86) PCT No.: PCT/DK2013/050399
§ 371 (c)(1),
(2) Date: May 29, 2015

(87) PCT Pub. No.: WO2014/086363
PCT Pub. Date: Jun. 12, 2014

(65) Prior Publication Data
US 2015/0308412 A1 Oct. 29, 2015

Related U.S. Application Data

(60) Provisional application No. 61/733,916, filed on Dec. 6, 2012.

(30) Foreign Application Priority Data

Dec. 6, 2012 (DK) .................. 2012 70761

(51) Int. Cl.
*F03D 9/00* (2016.01)
*H02P 9/04* (2006.01)
(Continued)

(52) U.S. Cl.
CPC ................ *F03D 9/003* (2013.01); *H02J 3/26* (2013.01); *H02J 3/386* (2013.01); *H02J 3/50* (2013.01);
(Continued)

(58) Field of Classification Search
USPC ..................... 290/44, 55; 363/154
See application file for complete search history.

(56) References Cited

U.S. PATENT DOCUMENTS 5,532,575 A * 7/1996 Ainsworth ............ H02J 3/1857
323/211
6,089,923 A * 7/2000 Phommachanh .... H05K 1/0228
439/676

(Continued)

FOREIGN PATENT DOCUMENTS

EP 0227872 A1 7/1987
EP 2166225 A1 3/2010

(Continued)

OTHER PUBLICATIONS

International Search Report for PCT/DK2013/050399, Jul. 4, 2014.

(Continued)

*Primary Examiner* — Pedro J Cuevas
(74) *Attorney, Agent, or Firm* — Patterson + Sheridan LLP

(57) ABSTRACT

A method for compensating an inductance imbalance in a three-phase alternating current electrical system is provided. An inductance imbalance is determined in the three-phase electrical system, an induction compensation device is selected based on the determination and thereafter applied within the three-phase electrical system. The induction compensation device is applied onto a power cable within the electrical system. A three-phase electrical system wherein an inductance imbalance is addressed with an inductance compensation device is further provided. A wind turbine generator comprising such a three-phase AC electrical system.

20 Claims, 8 Drawing Sheets

(51) Int. Cl.
*H02M 7/00* (2006.01)
*H02J 3/26* (2006.01)
*H02J 3/38* (2006.01)
*H02J 3/50* (2006.01)
*H02M 5/06* (2006.01)
*H02J 7/00* (2006.01)

(52) U.S. Cl.
CPC ....... H02M 7/003 (2013.01); *H02J 2007/0059* (2013.01); *Y02E 10/763* (2013.01); *Y02E 40/50* (2013.01)

(56) References Cited

U.S. PATENT DOCUMENTS

| | | | | |
|---|---|---|---|---|
| 6,239,994 | B1 * | 5/2001 | Abdoulin | H02M 3/33561 363/127 |
| 6,351,403 | B2 * | 2/2002 | Abdoulin | H02M 7/217 307/31 |
| 6,424,552 | B1 * | 7/2002 | Jacobson | H02M 7/537 363/154 |
| 6,428,362 | B1 * | 8/2002 | Phommachanh | H05K 1/0228 439/676 |
| 6,462,518 | B1 * | 10/2002 | Fischer | H02J 3/01 323/207 |
| 6,566,764 | B2 * | 5/2003 | Rebsdorf | F03D 9/003 290/44 |
| 6,566,769 | B1 | 5/2003 | Layton | |
| 6,844,722 | B2 * | 1/2005 | Migliori | G01N 27/9046 324/207.19 |
| 6,856,038 | B2 * | 2/2005 | Rebsdorf | F03D 9/003 290/44 |
| RE39,546 | E * | 4/2007 | Phommachanh | H05K 1/0228 333/1 |
| RE41,052 | E * | 12/2009 | Phommachanh | H01R 24/00 333/1 |
| 8,144,489 | B2 * | 3/2012 | Dommaschk | H02M 7/19 363/39 |
| RE43,366 | E * | 5/2012 | Phommachanh | H05K 1/0228 333/1 |
| 8,384,333 | B2 * | 2/2013 | Shimada | H02M 1/4233 318/438 |
| 8,558,405 | B2 * | 10/2013 | Brogan | H02J 3/386 290/55 |
| 8,670,254 | B2 * | 3/2014 | Perreault | H02M 7/797 363/159 |
| RE44,961 | E * | 6/2014 | Phommachanh | H05K 1/0228 333/1 |
| 8,860,236 | B2 * | 10/2014 | Nasiri | F03D 7/0272 290/44 |
| 2001/0002171 | A1 * | 5/2001 | Abdoulin | H02M 3/33561 363/89 |
| 2002/0079706 | A1 * | 6/2002 | Rebsdorf | F03D 9/003 290/55 |
| 2002/0122327 | A1 * | 9/2002 | Jacobson | H02M 7/537 363/154 |
| 2003/0030433 | A1 * | 2/2003 | Migliori | G01N 27/9046 324/220 |
| 2004/0026929 | A1 * | 2/2004 | Rebsdorf | F03D 9/003 290/44 |
| 2007/0070660 | A1 | 3/2007 | Tallam | |
| 2008/0074074 | A1 | 3/2008 | Skibinski et al. | |
| 2010/0020577 | A1 * | 1/2010 | Dommaschk | H02M 7/19 363/63 |
| 2011/0089693 | A1 * | 4/2011 | Nasiri | F03D 7/0272 290/44 |
| 2011/0121774 | A1 * | 5/2011 | Shimada | H02M 1/4233 318/729 |
| 2011/0181128 | A1 * | 7/2011 | Perreault | H02M 7/797 307/151 |
| 2012/0299305 | A1 * | 11/2012 | Brogan | H02J 3/386 290/55 |
| 2014/0111151 | A1 * | 4/2014 | Keeling | H01F 38/14 320/108 |
| 2015/0077067 | A1 * | 3/2015 | Kanjiya | H02H 7/067 322/21 |

FOREIGN PATENT DOCUMENTS

| | | |
|---|---|---|
| EP | 2458205 A1 | 5/2012 |
| EP | 2527647 A1 | 11/2012 |
| JP | 2005116191 A | 4/2005 |
| WO | 2005/034318 A2 | 4/2005 |
| WO | 20101136033 A1 | 12/2010 |

OTHER PUBLICATIONS

Danish Search Report for PA 2012 70761, Jul. 16, 2013.

* cited by examiner

THREE-PHASE AC ELECTRICAL SYSTEM, AND A METHOD FOR COMPENSATING AN INDUCTANCE IMBALANCE IN SUCH A SYSTEM

FIELD OF THE INVENTION

The invention generally relates to a three-phase alternating current (AC) electrical system for a wind turbine generator. In particular, the invention relates to methods and devices for compensating the inductive imbalances that may exist in such an electrical system.

BACKGROUND

In recent years, there has been an increased focus on reducing emissions of greenhouse gases generated by burning fossil fuels. One solution for reducing greenhouse gas emissions is to exploit renewable sources of energy. In particular, energy derived from the wind has proven to be an environmentally safe and reliable source of energy.

Energy in wind can be captured by a wind turbine, which is a rotating machine that converts the kinetic energy of the wind into mechanical energy, and the mechanical energy subsequently into electrical power. Common horizontal-axis wind turbines include a tower, a nacelle located at the apex of the tower, and a rotor that is supported in the nacelle by means of a shaft. The shaft couples the rotor either directly or indirectly with a rotor assembly of a generator housed inside the nacelle. The generator produces electrical power which is conditioned by a power converter before being provided to a power grid. A plurality of wind turbines may be arranged together to form a wind park or wind power plant.

State of the art wind turbine electrical systems comprise a plurality of power converters, typically connected in parallel to the generator. Each power converter comprises within itself a multitude of semiconductor switching circuits, which are generally used for power rectification and inversion, coupled about a dc-link. Unbalanced electric and magnetic components are known to be detrimental to the performance of switched power converter systems. The effects are particularly acute when converters are operated in parallel.

SUMMARY OF THE INVENTION

In the first aspect of the invention, there is provided a method for compensating an inductance, or inductive, imbalance in a three-phase alternating current (AC) electrical system of a wind turbine generator, comprising an electrical generator coupled to a plurality of parallel operated back-to-back power converters, the power converters being subsequently coupled to a load, the power converters receiving electrical power from the generator and delivering conditioned electrical power to the load, wherein the current of each phase of the three-phase AC electrical system is carried through separate power cables, the method comprising: determining an inductance imbalance in the three-phase electrical system, selecting an inductance compensation device based on the inductance imbalance determination, and applying the inductance compensation device within the three-phase electrical system.

BRIEF DESCRIPTION OF THE DRAWINGS

Embodiments of the present invention are explained, by way of example, and with reference to the accompanying drawings. It is to be noted that the appended drawings illustrate only examples of embodiments of this invention and are therefore not to be considered limiting of its scope, for the invention may admit to other equally effective embodiments.

FIG. 4b illustrates a pair of phase conductors coupled in an alternative manner as to FIG. 4a.

DETAILED DESCRIPTION

Figure 1:
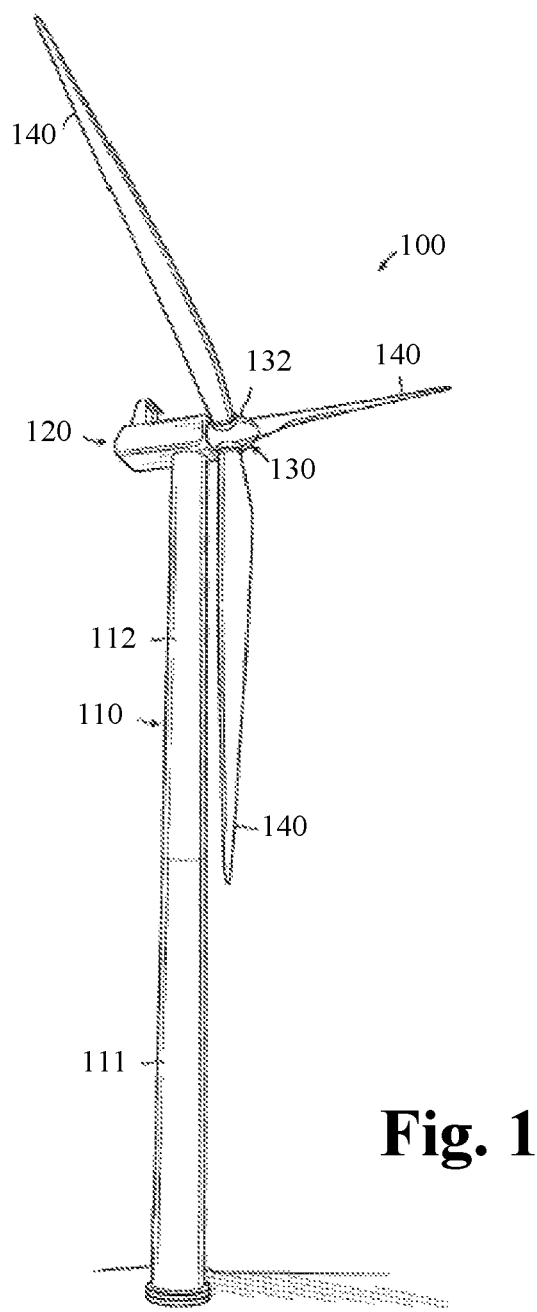
FIG. 1 illustrates a wind turbine.

Before turning to the detailed description of the drawings, a few more general items of the embodiment will be discussed.

As mentioned, state of the art wind turbine electrical systems typically comprise parallel-connected power converters, each power converter module comprising a multitude of electrical switches. In these power converters, the phase currents within each parallel converter module cannot be controlled on an individual basis if the parallel units are switched in unison. For practical reasons the electrical power switches (such as IGBT devices) are commonly switched in unison. The distribution of currents is therefore dependent on the electrical and magnetic balance that exists between these power converter modules and the respective phases.

In an ideal case, all electrical switch firing signals are received simultaneously and all component parameters are identical. In practice, however, there are differences in timings and component parameters such as inductance. The consequences of this imbalance may result in unbalanced power distribution between modules, negative sequence currents, DC-link current circulation and increased power loss within the switching devices.

For example, minor imbalances between grid inductors, which are coupled to the power converter for filtering output power, may cause significant circulating currents within the power converter DC-link inter-tie when the converters share a common dc-link. Imbalance in the grid inductors may arise from variations in the quality of materials or from variations in the production processes during the manufacture of the component. Similarly, inductance imbalances may also arise where cables may be of different length or have different placement and routing.

In the following, reference is made to embodiments of the invention. However, it should be understood that the invention is not limited to specific described embodiments. Instead, any combination of the following features and elements, whether related to different embodiments or not, is contemplated to implement and practice the invention.

Furthermore, in various embodiments, the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

In a first aspect, there is provided a method for compensating an inductance imbalance in a three-phase AC electrical system of a wind turbine generator, comprising an electrical generator coupled to a plurality of parallel operated back-to-back power converters, the power converters being subsequently coupled to a load, the power converters receiving electrical power from the generator and delivering conditioned electrical power to the load, wherein the current of each phase of the three-phase AC electrical system is carried through separate power cables, or transmission cables, the method comprising: determining an inductance imbalance in the three-phase electrical system, selecting an inductance compensation device based on the inductance imbalance determination, and applying the inductance compensation device within the three-phase AC electrical system.

Providing such a compensation method allows for the wind turbine to function and operate with balanced electrical characteristics. The unbalanced system (initial state) is corrected with the addition of one or more inductance compensation devices to form a balanced system.

Such a method can be carried out by trained service technicians during the commissioning of the wind turbine, or during scheduled maintenance checks. As mentioned, such inductance imbalance is relatively common in installed electrical systems, and plant operators have tended to overlook, or accept as commonplace, such deviations in component matching leading to circulating currents. However, the inventors of the present invention have run tests according to the present invention, and have noticed that significant reduction in circulating current has been observed once the components have been balanced.

Further, it is noted that balanced systems will operate more smoothly and efficiently. Power flow is evenly distributed between strings with reductions in dc-link pulsations and other stresses, thereby allowing the components within the systems to function for a longer period of time.

Cable routing and length, together with factors such as position within the conduit, phase bundling, transpose of the phases, affect the inductance balance of the power cables and therefore also the electrical system. However if cables of the same length are used and if careful attention is paid to the placement and routing, then the inductive imbalance due to cables is likely to be small compared to the inductive imbalance due to the power chokes.

In providing the inductance compensation device onto the power cables, the method addresses both the inductance imbalance of the cables and the electromagnetic device to which the cables are attached. It is also noted that if multiple compensation devices are required, the compensation devices need not be placed at a single location, and may instead be distributed over several locations along the cable. This reduces the possibility of the localized cable overheating.

In an embodiment, the inductance compensation devices are applied to individual power cables within the converter. In doing so the self-inductance of the phase is modified. The controlled modification of self-inductance allows for the compensation devices to efficiently work towards balancing of the electrical system.

In another embodiment, the inductance compensation device is applied onto two or more power cables simultaneously. In doing so both the self-inductance and the mutual-inductance of these phases is modified. The judicious modification of self and mutual inductance allows for the compensation devices to efficiently work towards balancing of the electrical system.

In an embodiment, the induction compensation device is applied onto multiple power cables in any of the following configurations: a mutual coupling, a forward coupled pair, a reverse coupled pair, a forward coupled triplet, a reverse coupled triplet, and a double reverse pair. Each configuration provides a specific characteristic towards the capacity of inductance, and thus towards the balance of the electrical system.

In an embodiment, the inductance compensation devices may have similar inductances or they may have dissimilar inductance.

In an embodiment, the power cables may pass once through the inductance compensation device or alternatively the power cables may be wrapped around the core numerous times.

In an embodiment, determining the inductance imbalance comprises isolating a portion of the three-phase electrical system, and determining the self and mutual inductances for each phase of this portion of circuit. The inductances may be determined from measurement of voltages and currents when the portion of circuit is excited by an external source. The source may be single phase or three phases. The source may be a resonant source. This allows the portion of the electrical system which comprises the inductance imbalance, to be analyzed separately. An accurate determination of inductance may be made. Further, determining the inductance at a current level near to the rated current allows the electrical characteristics of the system to be determined as would be expected during normal turbine operation. A sinusoidal excitation with low distortion is used for maximum effectiveness.

In a second aspect of the invention, there is provided a three-phase alternating current (AC) electrical system for a wind turbine generator, comprising an electrical generator coupled to a plurality of parallel operated back-to-back power converters, the power converters being subsequently coupled, or arranged to be subsequently coupled, to a load, the power converters being arranged to receive electrical power from the electrical generator and to deliver conditioned electrical power to the load, the current of each phase of the three-phase AC electrical system is carried through separate power cables, and an inductance compensation device applied onto a power cable to address an inductance imbalance in the three-phase AC electrical system.

In an embodiment, the inductance compensation device is applied onto multiple power cables. In a further embodiment, a first inductance compensation device is applied onto a power cable, and a second inductance compensation device is applied onto multiple power cables. In another embodiment, the inductance compensation device comprises multiple inductors coupled to each other with electrical wires. The coupling wires may have one or more turns around each inductor core.

In an embodiment, the electrical system comprises a grid inductor for the grid side of the power converter, and wherein an induction compensation device is applied onto a power cable between the grid inductor and the power converter. In another embodiment, the electrical system comprises a generator filter inductor for the machine side of the power converter, and wherein an induction compensation device is applied onto a power cable between the generator filter and the power converter. Having such arrangements allow for the component balancing of electrical system of the power converter at both the input from the electrical generator and the output to the transformer.

In an embodiment, wherein the inductance compensation device comprises a solid annular or pipe shaped magnetic core. This design is simple, robust and inexpensive. The core is slipped directly over the power cables thereby enabling the convenient in situ tuning of the power choke. The compensation devices are intended to fine-tune the inductance balance, they are not intended to add "bulk inductance" to the inductor. In another embodiment, the inductance compensation device comprises the shape of an annulus with a small air gap. Inductance is determined in part by the air gap distance which is accurately set by the stamping tolerance. Having a fixed air gap provides that the inductor is not liable to become forced out of tolerance by vibrations or handling. It is noted that the air gap is sized to ensure that the flux density remains low under all normal operating conditions, to maintain linearity and prevent overheating. In yet another embodiment, the inductance compensation device comprises integral cooling fins. Having such fins assist with the cooling of the cores, and of the cable being surrounded.

In another embodiment, the inductance compensation device is constructed from stacked sheets/laminations of silicon steel. Lamination reduces magnetically induced eddy currents thereby improving efficiency and reducing heat generation. Other low loss materials, such as ferrite, Sendust, and iron powder, may also be used. In an embodiment, the inductance compensation device comprises a variable air gap inductor.

Having such a variable air gap inductor allows for a calibrated variable inductance device to accurately tune the inductance. The variable air gap inductor can remain as the inductance compensation device or may then be replaced by the standard fixed value inductors.

In a third aspect of the present invention, there is provided a wind turbine generator comprising a three-phase AC electrical system according to any of the embodiments of the three-phase AC electrical system disclosed herein.

The following is a detailed description of embodiments of the invention depicted in the accompanying drawings. The embodiments are examples and are in such detail as to clearly communicate the invention. However, the amount of detail offered is not intended to limit the anticipated variations of embodiments; but on the contrary, the intention is to cover all modifications, equivalents, and alternatives falling within the spirit and scope of the present invention as defined by the appended claims.

FIG. 1 illustrates an exemplary wind turbine generator, also called wind turbine, 100 according to an embodiment. As illustrated in FIG. 1, the wind turbine 100 includes a tower 110, a nacelle 120, and a rotor 130. In one embodiment of the invention, the wind turbine 100 may be an onshore wind turbine. However, embodiments of the invention are not limited only to onshore wind turbines. In alternative embodiments, the wind turbine 100 may be an offshore wind turbine located over a water body such as, for example, a lake, an ocean, or the like. The tower 110 of such an offshore wind turbine is installed on either the sea floor or on platforms stabilized on or above the sea level.

The tower 110 of wind turbine 100 may be configured to raise the nacelle 120 and the rotor 130 to a height where strong, less turbulent, and generally unobstructed flow of air may be received by the rotor 130. The height of the tower 110 may be any reasonable height, and should consider the length of wind turbine blades extending from the rotor 130. The tower 110 may be made from any type of material, for example, steel, concrete, or the like. In some embodiments the tower 110 may be made from a monolithic material. However, in alternative embodiments, the tower 110 may include a plurality of sections, for example, two or more tubular steel sections 111 and 112, as illustrated in FIG. 1. In some embodiments of the invention, the tower 110 may be a lattice tower. Accordingly, the tower 110 may include welded steel profiles.

The rotor 130 may include a rotor hub (hereinafter referred to simply as the "hub") 132 and at least one blade 140 (three such blades 140 are shown in FIG. 1). The rotor hub 132 may be configured to couple the at least one blade 140 to a shaft (not shown). In one embodiment, the blades 140 may have an aerodynamic profile such that, at predefined wind speeds, the blades 140 experience lift, thereby causing the blades to rotate around the hub. The hub 132 further comprises mechanisms (not shown) for adjusting the pitch of the blade 140 to increase or reduce the amount of wind energy captured by the blade 140. Pitching adjusts the angle at which the wind strikes the blade 140.

The hub 132 typically rotates about a substantially horizontal axis along the drive shaft extending from the hub 132 to the nacelle 120. The drive shaft is usually coupled to one or more components in the nacelle 120, which are configured to convert rotational energy of the shaft into electrical energy.

Figure 2:
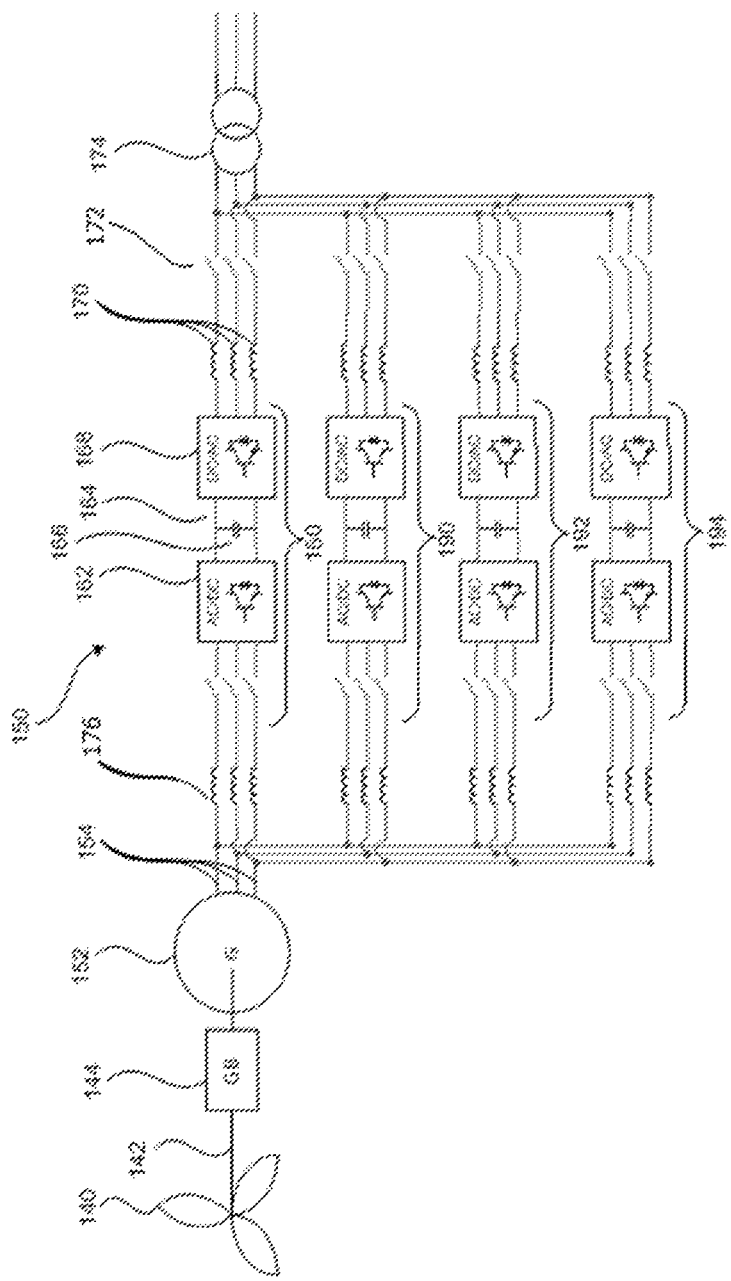
FIG. 2 illustrates a three-phase electrical system with power converters connected in parallel. The dc-links may or may not be inter-connected.

FIG. 2 illustrates a three-phase electrical system 150 for a wind turbine according to an embodiment of the present invention. The blades 140 capture wind energy which is translated to mechanical energy through the rotation of a drive shaft 142, for conversion to electrical energy by an electrical generator 152. The generator 152 may be a singly or doubly-fed synchronous generator, a permanent magnet generator, an induction generator or any other type of generator comprising a stator winding. The gear box 144, if present, steps up the low rotational speed of the drive shaft 142 to a high rotational speed suitable for operating the generator 152. The rotational speed of the drive shaft 142 is typically in the range of 10-20 revolutions per minute. The rotational speed of the rotor of the generator 152 is typically significantly higher. The optimum rotational speed of the rotor of the generator 152 depends on the internal characteristics and type of the generator 152 and may vary according to the number of poles of the generator 152. It is also possible to omit the gear box 144 by using a multi-pole generator suitable for a low rotational speed of the drive shaft 142. In this case, the drive shaft 142 is directly coupled to the generator 152. An alternative transmission may also be provided at the drive shaft 142, instead of a gear box, in order to drive the generator 152 as required.

To allow a variable speed of the drive shaft 142, a power converter module 160 is connected to the stator terminals 154 of the generator 152. In this embodiment, the power converter 160 is an alternating current (AC)-AC power converter. In certain embodiments, there might be provided a generator side filter 176 in connection between the generator 152 and the power converter 160.

The power converter 160 comprises a generator side converter 162 operating as an active pulse-width-modulated (PWM) rectifier. The generator side converter 162 rectifies the AC electrical power from the generator to a direct-current (DC) electrical power, which in turn provides electrical power to a DC link 164. The DC link 164 includes a DC link capacitor 166, for smoothing power on the DC link 164. The DC link 164 could alternatively be of a different configuration, for example having inductors or capacitor banks. The DC link 164 thereafter feeds the DC power to the grid-side converter 168 operating as an inverter, which produces power at a 3-phase AC output. The generator side converter 162 and the grid-side converter 168 both comprise electronic switches such as power semiconductor switches, and in this embodiment, Insulated Gate Bipolar Transistors (IGBTs). Use of other switches is also possible. The components within the power converter 160 are usually controlled and managed by a power controller unit (not shown).

Each phase output of the grid-side converter 168 is coupled to a grid inductor 170 which smoothens out the current output of the electrical switching and the time delay created allow for proper control by the power controller unit. The grid inductors 170 also act as a low pass bandwidth filter and prevent high frequency components from the grid from entering the electrical system 150. The grid inductor 170 stores energy during one portion of each switching period and returns this energy to the circuit during another portion of the period, thus smoothing the current flow.

The electrical system 150 of the present embodiment comprises a plurality of similar power converter modules 160, 190, 192, 194. Other embodiments may comprise any number of power converter modules, depending on the power rating of the converter modules and the intended power output of the electrical system.

The output of the power converter modules are thereafter fed to a step-up transformer 174 through a circuit breaker 172. The circuit breaker either couples or decouples the electrical system 150 to the transformer and a power grid. The transformer 174 steps up the voltage of the power provided by the electrical system 150 to a predetermined level, in this case 33 kV, which is suitable for minimizing loss during delivery.

In such a three-phase AC electrical system 150 comprising multiple power converter modules 160, 190, 192, 194, a load-sharing concept is typically desired, i.e. the intended power output of the electrical system 150 is to be equally provided by the power converter modules within the electrical system. The grid inductors 170 coupled to the power converter module outputs are carefully tuned to enable even distribution of power and reduce the circulation of current from one power converter module to another. As indicated above, it is desirable to have the inductance of each phase of each grid inductor to be balanced In order to provide a balanced circuit, the present embodiment seeks to determine any imbalances in the inductances of the grid inductors and to address them thereafter with supplementary inductance compensation devices.

In the present embodiment, grid inductors coupled to the three-phase output of the power converter module 160 are provided by three limb inductors. Each phase winding possesses its own self-inductance and is mutually coupled with the other two phases. Matrix (1) provides a reference to the inductance.

$$L = [L_{aa} M_{ab} M_{ac}$$

$$M_{ba} L_{bb} M_{bc}$$

$$M_{ca} M_{cb} L_{cc}] \quad (1)$$

As the magnetic path is the same, the mutual inductance between phases taken in pairs is equal. This is to say Mab=Mba, Mac=Mca and Mbc=Mcb. The self-inductances Laa, Lbb and Lcc have different magnetic paths which includes a leakage flux component. In order to be completely balanced, the self-inductance of each phase should be equal. Likewise the mutual couplings between different phase pairs should be equal, which is to say Mab=Mbc=Mca. The manufacturer attempts to minimize the differences in these inductances by symmetrical design and careful assembly. However, despite these efforts some differences will occur. Some causes of variation, such as material quality, are generally beyond the direct control of the manufacturer.

It is also noted that inductances vary with changes to operating condition. For example, the inductances change with frequency. At high frequency in particular, eddy currents within the laminations reduce the effective flux linkage. On the other hand the leakage flux, which is not necessarily confined to the core, is affected differently. A balanced system at one frequency may conceivably be out of balance at another frequency.

Inductance also changes with current loading. As the H field is increased, the magnetic flux density (B) approaches saturation and becomes increasingly non-linear. Effective flux linkage similarly becomes increasingly non-linear. A balanced system at one level of current may therefore not be balanced at another level of current.

Further, inductance is partially dependent on temperature. During operation, the temperature of the core increases at the same time the magnetic properties of the material also change. Ambient temperature and method for cooling may therefore affect the system balance.

The process of balancing the inductance in the system is thus performed preferably at near rated conditions (current, temperature and frequency, etc.) so that the benefits of a balanced inductive system are experienced at the normal operating point of the system.

For example, let us imagine that an air gap in one limb of the grid inductor becomes slightly larger than the others. This may be a result of an assembly error. In this scenario the self-inductances and mutual inductances for all the phases no longer equal that of an ideally balanced grid choke. To subsequently re-balance the inductor it is necessary to modify both the mutual and self-inductances.

Mutual inductance between phases may be increased or decreased by coupling the power cables in a forward or reverse direction. The mutual inductances may be corrected pair-wise. Inductance compensation devices of the required values are then placed over the cables of the respective phase pairs. In correcting the mutual inductances, the self-inductance of each phase is also changed. The subsequent step is then to correct the self-inductances. The self-inductances are measured and the required inductance compensation device is applied.

The self-inductance is corrected for each phase individually. Inductance compensation devices of the values calculated are placed over the power cables directly. Note that changing the self-inductance in this manner does not affect the mutual inductances. For this reason, the self-inductance is corrected after the mutual inductance has first been corrected.

A variable inductance device, such as a variable air gap inductor, may be used in the testing and tuning of the system. This allows the system to be balanced without having to disconnect the power cables from their terminations. Once a reasonable balance has been achieved, the power cables are disconnected, the variable inductances are removed and these are replaced with the inexpensive fixed-inductance compensation devices.

The induction compensation devices (tuning inductors) 184, 186, 188 are added to the power cables coupling the grid side converter 168 to the grid inductor 170. Physically, these tuning inductors will be located in the same metal shielded cabinet that houses the grid inductors 170. In this way, electromagnetic emissions are reduced.

Figure 3:
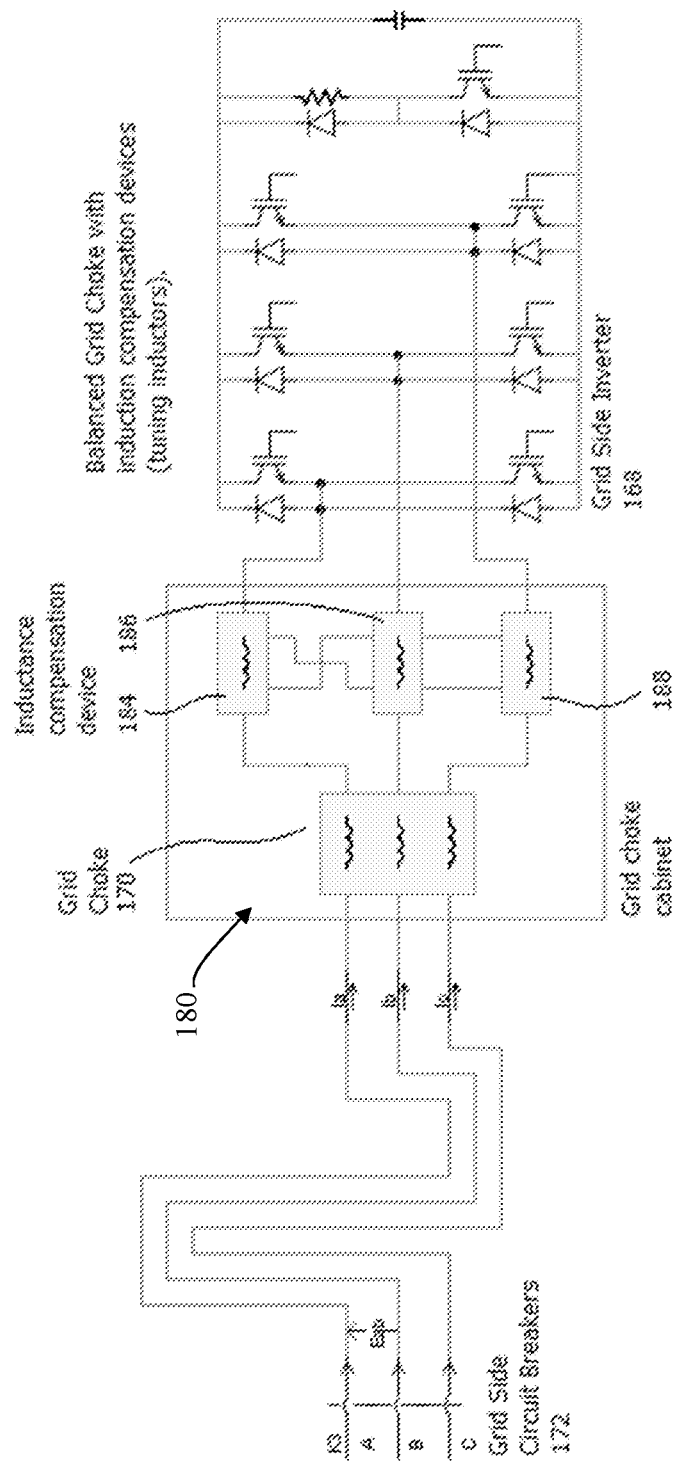
FIG. 3 illustrates a balanced electrical system according to an embodiment.

FIG. 3 illustrates a balanced portion of electrical system 150. Induction compensation devices 184, 186, 188, are added to the power cables between the power converter 160 and the grid inductor 170.

Figure 4A:
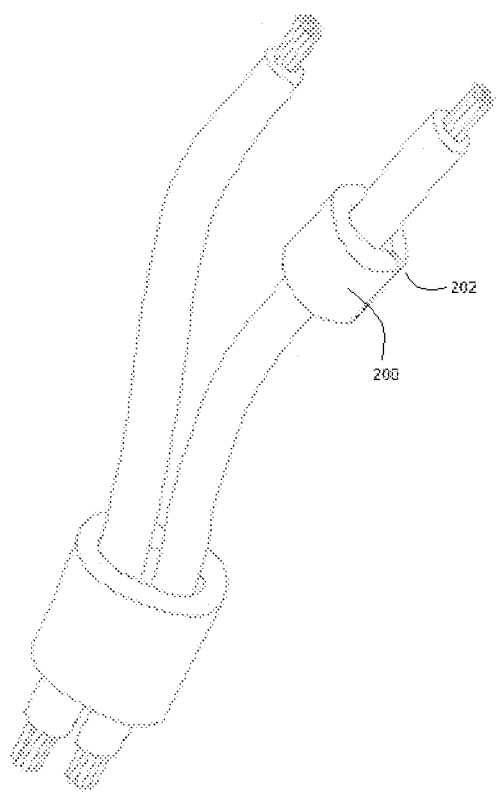
FIG. 4a illustrates a pair of phase conductors coupled with an induction compensation device according to an embodiment.
Figure 4B:
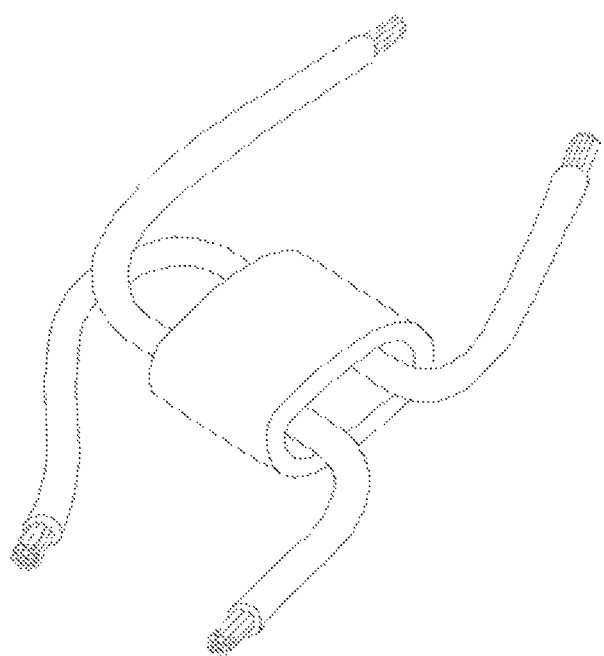

FIG. 4a illustrates a pair of phase conductors coupled with an induction compensation device according to another embodiment. Tuning inductor 200 according to the present embodiment is an inductor having a linear hollow core, intended to be used with the phase conductors passing through the core itself.

In the embodiment, the core is formed from thin laminated silicon steel sheet, stamped in the shape of an annulus with a small air gap 202 (perhaps 2-3 mm in width). The tuning inductance 200 is thereafter formed by stacking these ferromagnetic core stampings. Inductors of standard sizes may be formed. For example, the pre-assembled standard core stacks may be 1 uH, 2 uH and 5 uH. The air gap 202 is fixed and is not liable to become forced out of tolerance by vibrations or handling. The core stacks may be coated (e.g. dipped in polyester, epoxy or other material) to provide protection against corrosion and insulates the laminations from accidental short circuit. Recall that these are low inductance devices intended only for fine tuning of the much larger grid inductor 170.

The tuning inductor cores are slipped over the cables as required so as to modify the inductance of the grid choke and cable to the desired value. The core is designed such as to allow the cable terminal lugs to pass through the hole in the core. There is thus no need to re-terminate the cables. Passing a phase cable individually through a tuning inductor provides for self-inductance correction. Coupling two phase cables through the same core of a tuning inductor allows for mutual inductance correction.

The tuning inductor 200 is dimensioned so that flux density remains below saturation under all normal operating conditions. The intention is to prevent overheating and damage to the cable insulation. Temperature monitoring may be incorporated for safety reasons, however severe current imbalance or current overload should normally be detected by the controller which supervises the converter.

In high temperature applications, alternative cable insulation, such as Teflon, silicone and glass, may be considered.

The air gap of the tuning inductors may be filled with non-magnetic material, partially to prevent tramp metals from accidentally entering that space and partially to reduce the proximity effect that air gap flux may have on the cable core.

In designing the tuning inductors of the present embodiment, a circular core section is considered to be favorable in terms of core utilization and flux distribution. The inner diameter is determined by the size of the power cables and clearance from the air-gap. Core size is also influenced by the cooling requirements. In general the surface area to volume ratio is improved if the outer diameter is smaller. A smaller radius requires a longer stack height to achieve the same inductance. Consequently, with respect to cooling, a longer and thinner inductor is preferable.

The placement of tuning inductors in different configurations modifies the magnetic balance of the choke and cables in a great variety of ways. The modification can be described in terms of a Correction Matrix which describes how the mutual and self-inductances are changes as a result of the tuning inductors.

It is evident that a large number of Correction Matrices may be formed. Any number of tuning inductors may be added to each phase. Further, the tuning inductors may be uncoupled or coupled in either the forward or reverse direction. The coupling cables may pass just once through the inductors or may be wound several times around either of the inductor cores.

Although many variations exist, for practical reasons, it is desirable adopt a simple configuration using as few inductors as possible.

Figure 5A:
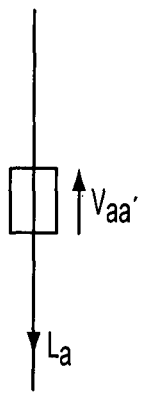
FIG. 5a illustrates a first induction compensation device according to an embodiment.

FIG. 5a illustrates a first induction compensation device according to an embodiment. The figure illustrates a single inline inductor. This device may be governed by the equation:

$$V_{aa'} = M di_a/dt$$

Figure 5B:
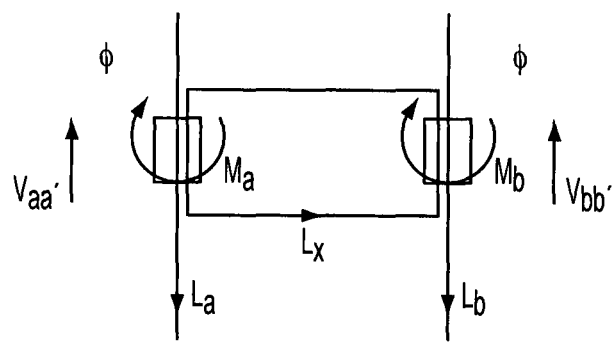
FIG. 5b illustrates a second induction compensation device according to an embodiment.
Figure 5C:
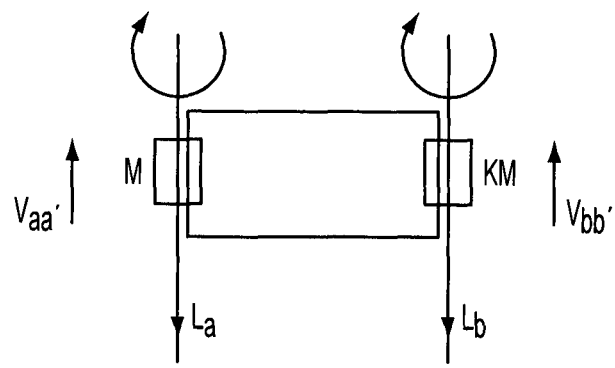
FIG. 5c illustrates a third induction compensation device according to an embodiment.

FIG. 5b illustrates a second induction compensation device according to an embodiment. The figure illustrates a forward coupled pair, of which the characteristics may be provided by the following equations:

$$V_{aa'} = M_a di_a/dt + M_a di_x/dt$$

$$V_{bb'} = M_b di_b/dt - M_b di_x/dt$$

$$V_{aa'} = V_{bb'}(r_{cable} \rightarrow 0)$$

$$di_x/dt = (M_b di_b/dt\ M_a di_a/dt)/(M_a + M_b)$$

which leads to:

$$V_{aa'} = M_a di_a/dt + (M_a M_b di_b/dt)/(M_a + M_b) - M_a^2 di_a/dt/(M_a + M_b)$$

$$V_{bb'} = M_b di_b/dt + (M_a M_b di_a/dt)/(M_a + M_b) - M_b^2 di_b/dt/(M_a + M_b)$$

However, if we take $M_a = K M_b$, where $0 < K < 1$, then the following equations are obtained:

$$V_{aa'} = (MK)/(1+K) di_a/dt + (MK)/(1+K) di_b/dt$$

$$V_{bb'} = (MK)/(1+K) di_a/dt + (MK)/(1+K) di_b/dt$$

The Correction Matrix is obtained as follows:

$$M \begin{bmatrix} \frac{K}{1+K} & \frac{K}{1+K} & 0 \\ \frac{K}{1+K} & \frac{K}{1+K} & 0 \\ 0 & 0 & 0 \end{bmatrix}$$

Figure 5D:
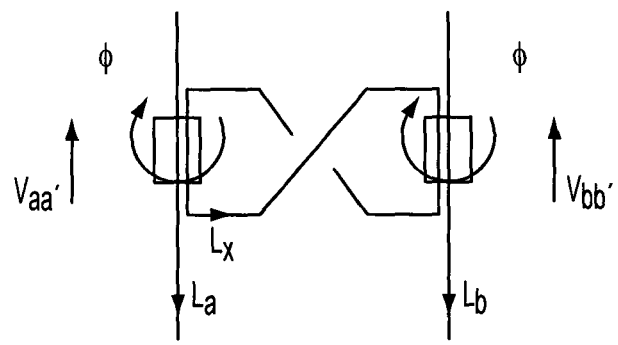
FIG. 5d illustrates a fourth induction compensation device according to an embodiment.

FIG. 5d illustrates a reverse coupled pair, of which the characteristics may be provided by the following equations:

$$V_{aa'} = M_a \frac{di_a}{dt} + M_a \frac{di_x}{dt}$$

$$V_{bb'} = M_b \frac{di_b}{dt} - M_b \frac{di_x}{dt}$$

$$V_{aa'} = -V_{bb'} \quad (r_{cable} \to 0)$$

$$\frac{di_x}{dt} = \frac{\left(-M_b \frac{di_b}{dt} - M_a \frac{di_a}{dt}\right)}{(M_a + M_b)}$$

$$V'_{aa} = M_a i_a + M_a i_x$$

$$V'_{bb} = M_b i_b - M_b i_x$$

$$V'_{aa} = -V'_{bb}$$

$$i_x = \frac{-M_a i_a}{(M_a + M_b)} - \frac{M_a i_b}{(M_a + M_b)}$$

which leads to:

$$V_{aa'} = M_a di_a/dt[1 - M_a/(M_a + M_b)] - (M_a M_b di_b/dt)/(M_a + M_b)$$

$$V_{bb'} = M_b di_b/dt[1 - M_b/(M_a + M_b)] - (M_a M_b di_a/dt)/(M_a + M_b)$$

However, if we take $M_a = KM_b$, where $0 < K < 1$, then the following equations are obtained:

$$V_{aa'} = (MK)/(1+K) di_a/dt - (MK)/(1+K) di_b/dt$$

$$V_{bb'} = -(MK)/(1+K) di_a/dt + (MK)/(1+K) di_b/dt$$

A correction matrix is also obtained, and as follows:

$$M \begin{bmatrix} \frac{K}{1+K} & \frac{-K}{1+K} & 0 \\ \frac{-K}{1+K} & \frac{K}{1+K} & 0 \\ 0 & 0 & 0 \end{bmatrix}$$

Figure 5E:
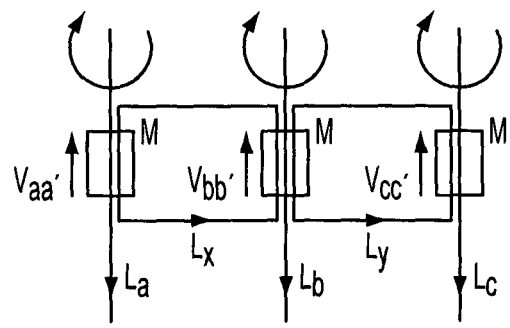
FIG. 5e illustrates a fifth induction compensation device according to an embodiment.
Figure 5F:
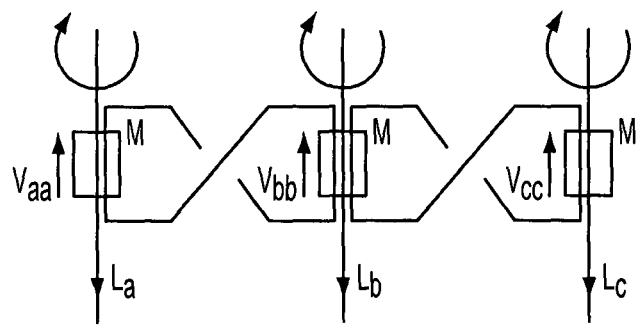
FIG. 5f illustrates a sixth induction compensation device according to an embodiment.

FIG. 5e illustrates a forward coupled triplet according to an embodiment. Within this configuration, there is there is no differential inductance. Thereby, the following is provided:

$$i_x = -i_a, i_y = i_c (r_{cable} \to 0)$$

$$i_b + i_y - i_x = i_a + i_b + i_c \to 0$$

A correction matrix is obtained, and as follows:

$$\frac{M}{3} \begin{bmatrix} 1 & 1 & 1 \\ 1 & 1 & 1 \\ 1 & 1 & 1 \end{bmatrix}$$

FIG. 5e illustrates a fifth induction compensation device according to an embodiment. The figure illustrates a reverse coupled triplet, of a correction matrix is provided as follows:

$$\frac{M}{3} \begin{bmatrix} 1 & -1 & 1 \\ -1 & 1 & -1 \\ 1 & -1 & 1 \end{bmatrix}$$

Figure 5G:
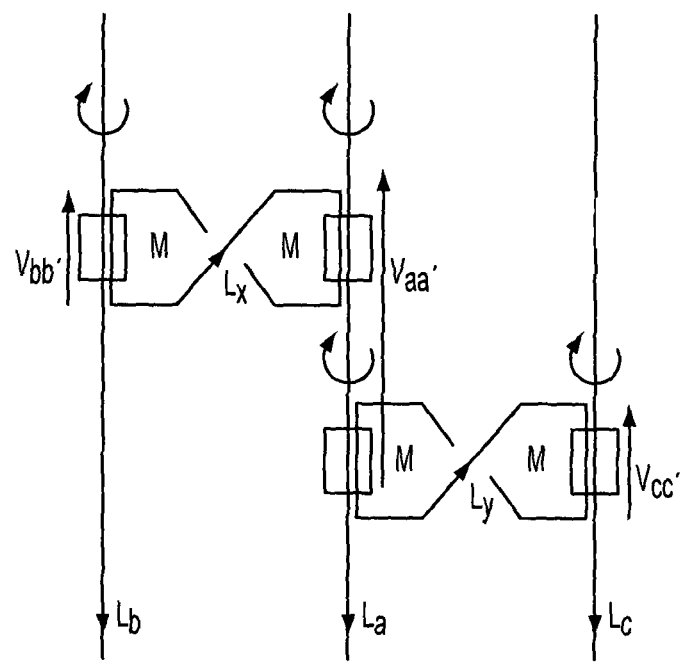
FIG. 5g illustrates a seventh induction compensation device according to an embodiment.

FIG. 5g illustrates a sixth induction compensation device according to an embodiment. The figure illustrates a double reverse pair, of a Correction Matrix is provided as follows:

$$\frac{M}{2} \begin{bmatrix} 1 & -1 & 0 \\ -1 & 1 & 0 \\ 0 & 0 & 0 \end{bmatrix} + \frac{M}{2} \begin{bmatrix} 1 & 0 & -1 \\ 0 & 0 & 0 \\ -1 & 0 & 1 \end{bmatrix} = M \begin{bmatrix} 1 & -1/2 & -1/2 \\ -1/2 & 1/2 & 0 \\ -1/2 & 0 & 1/2 \end{bmatrix}$$

It is to be noted that the various embodiments of the inductor compensation device are not to be limited. It is also be possible to combine different configurations, for example, PhaseA and PhaseB may form a forward coupled pair while PhaseB and PhaseC may form a reverse coupled pair. Such combinations allow the Correction Matrix to be manipulated in many directions. However, although many variations exist, for practical reasons, it is desirable to adopt a simple configuration using as few inductors as possible.

Coming back to the electrical system 150 of FIG. 2, it may be seen that inductive imbalances may exist both on the grid-side (grid inductors 170 and connecting cables) and on the generator side (differential filters 176 and connecting cables). In an embodiment of the invention, the inductance imbalance is determined and addressed on the generator side of the electrical system.

On the grid side, the inductances are relatively large. For example, in the present embodiment, the grid inductor 170 is rated at say 500 µH. With inductor tolerances being at about 5% of nominal inductance, the inductor compensation devices to be used at the grid side for balancing tend to be relatively large, say 0-20 uH. On the generator side, the inductance of the filter and cables is relatively small, say 40 uH. As such, when balancing the inductances on the generator side, the inductance compensation device to be used would be significantly smaller than that on the grid side. This places particular demands on the precision with which the generator side inductances should be balanced.

While the invention has been illustrated by a description of various embodiments and while these embodiments have been described in considerable detail, it is not the intention of the applicant to restrict or in any way limit the scope of the appended claims to such detail. Additional advantages and modifications will readily appear to those skilled in the art.

The above-mentioned features and embodiments of the method, system and wind turbine generator, respectively, may be combined in various possible ways providing further advantageous embodiments.

The invention in its broader aspects is therefore not limited to the specific details, representative methods, and illustrative examples shown and described. Accordingly, departures may be made from such details without departing from the spirit or scope of applicant's general inventive concept.

What is claimed is:

1. A method for compensating an inductance imbalance in a three-phase alternating current (AC) electrical system of a wind turbine generator,
the wind turbine generator comprising an electrical generator providing electrical power to a plurality of parallel-operated back-to-back power converters, the plurality of parallel-operated back-to-back power converters delivering conditioned electrical power to a load, wherein current of each phase of the three-phase AC electrical system is carried through separate power cables,
the method comprising:
determining the inductance imbalance in the three-phase AC electrical system;

selecting an inductance compensation device based on the determined inductance imbalance; and applying the selected inductance compensation device within the three-phase AC electrical system.

2. The method according to claim 1, wherein applying the selected inductance compensation device comprises applying the selected inductance compensation device onto a power cable.

3. The method according to claim 1, wherein applying the selected inductance compensation device comprises applying the selected inductance compensation device onto multiple power cables.

4. The method according to claim 2, further comprising:
applying another inductance compensation device onto multiple power cables.

5. The method according to claim 3, wherein the selected induction compensation device is applied onto the multiple power cables with one or more of the following configurations: a mutual coupling, a forward coupled pair, a reverse coupled pair, a forward coupled triplet, a reverse coupled triplet, and a double reverse pair.

6. The method according to claim 1, wherein determining the inductance imbalance comprise:
isolating a portion of the three-phase AC electrical system; and
determining inductances for each phase of the isolated portion.

7. The method according to claim 6, wherein isolating a portion of the three-phase AC electrical system comprises isolating an electrical circuit between (1) the power converter and (2) the electrical generator or the load, the method further comprising:
applying an AC source to the isolated electrical circuit,
wherein determining inductances for each phase is performed at a near-rated current of the three-phase AC electrical system.

8. The method according to claim 6, wherein determining inductances for each phase of the isolated portion comprises determining a self-inductance and a mutual inductance of each phase.

9. The method according to claim 8, wherein the self-inductance and the mutual inductance is determined for a set of three-phase power cables at a specified point in the three-phase AC electrical system.

10. A three-phase alternating current, (AC) electrical system for a wind turbine generator, comprising:
an electrical generator configured to provide electrical power to a plurality of parallel-operated back-to-back power converters, the plurality of parallel-operated back-to-back power converters configured to deliver conditioned electrical power to a load, a current of each phase of the three-phase AC electrical system being carried through separate power cables; and
an inductance compensation device applied, onto at least one power cable to at least partially compensate an inductance imbalance in the three-phase AC electrical system.

11. The three-phase AC electrical system according to claim 10, wherein the inductance compensation device is applied onto multiple power cables.

12. The three-phase AC electrical system according to claim 10, wherein the inductance compensation device is applied onto one power cable, the three-phase AC electrical system further comprising:
another inductance compensation device applied onto multiple power cables.

13. The three-phase AC electrical system according to claim 10, wherein the inductance compensation device comprises multiple inductors coupled to each other with electrical cables.

14. The three-phase AC electrical system according to claim 10, further comprising:
a plurality of grid inductors, each grid inductor corresponding to a respective output of one of the plurality of parallel-operated back-to-back power converters,
wherein the induction compensation device comprises a plurality of induction compensation devices, each induction compensation device is applied onto a respective power cable between a corresponding grid inductor and a corresponding power converter.

15. The three-phase AC electrical system according to claim 10, further comprising:
a plurality of generator filters, each generator filter corresponding to a respective input of one of the plurality of parallel-operated back-to-back power converters,
wherein the induction compensation device comprises a plurality of induction compensation devices, each induction compensation device is applied onto a respective power cable between a corresponding generator filter and a corresponding power converter.

16. The three-phase AC electrical system according to claim 10, wherein the inductance compensation device comprises a linear hollow-core inductor.

17. The three-phase AC electrical system according to claim 10, wherein the inductance compensation device is substantially cylindrical or annular and defines with a small air gap.

18. The three-phase AC electrical system according to claim 10, wherein the inductance compensation device comprises a stack of multiple layers of laminated, stamped silicon steel sheet.

19. The three-phase AC electrical system according to claim 10, wherein the inductance compensation device comprises a variable inductor defining an adjustable air gap.

20. A wind turbine, comprising:
a tower;
a nacelle disposed on the tower; and
a three-phase alternating current (AC) electrical system at least partially disposed in the nacelle and comprising:
an electrical generator configured to provide electrical power to a plurality of parallel-operated back-to-back power converters, the plurality of parallel-operated back-to-back power converters configured to deliver conditioned electrical power to a load, a current of each phase of the three-phase AC electrical system being carried through separate power cables; and
an inductance compensation device applied, onto at least one power cable to at least partially compensate an inductance imbalance in the three-phase AC electrical system.

* * * * *